United States Patent
Hojo

(10) Patent No.: US 10,707,533 B2
(45) Date of Patent: Jul. 7, 2020

(54) PROCESSING DEVICE OF NONAQUEOUS ELECTROLYTE SECONDARY BATTERY AND MANUFACTURING METHOD THEREOF

(71) Applicant: TOYOTA JIDOSHA KABUSHIKI KAISHA, Toyota-shi, Aichi-ken (JP)

(72) Inventor: Katsuyuki Hojo, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/205,893

(22) Filed: Nov. 30, 2018

(65) Prior Publication Data

US 2019/0103628 A1    Apr. 4, 2019

Related U.S. Application Data

(62) Division of application No. 13/133,428, filed as application No. PCT/JP2010/053798 on Mar. 8, 2010, now abandoned.

(51) Int. Cl.
*H01M 10/058* (2010.01)
*H01M 2/10* (2006.01)
(Continued)

(52) U.S. Cl.
CPC ....... *H01M 10/058* (2013.01); *H01M 2/1077* (2013.01); *H01M 10/0413* (2013.01);
(Continued)

(58) Field of Classification Search
CPC .......... H01M 10/058; H01M 10/0413; H01M 10/0468; H01M 10/0481; H01M 10/052;
(Continued)

(56) References Cited

U.S. PATENT DOCUMENTS

| 4,020,244 A | 4/1977 | Selinko |
| 6,432,576 B1 | 8/2002 | Hikmet |
| (Continued) |

FOREIGN PATENT DOCUMENTS

| JP | 11-339853 A | 12/1999 |
| JP | 2004-139961 A | 5/2004 |
| (Continued) |

OTHER PUBLICATIONS

U.S. Appl. No. 13/133,428, having a national phase entry on Jun. 8, 2011.

(Continued)

*Primary Examiner* — Jimmy Vo
(74) *Attorney, Agent, or Firm* — Finnegan, Henderson, Farabow, Garrett & Dunner, LLP

(57) ABSTRACT

To melt and diffuse metallic foreign bodies immixed in electrodes of a nonaqueous electrolyte secondary battery before initial charging, electrodes wound with a separator between a cathode plate and an anode plate are placed in a battery case and the battery case is filled with an electrolyte. After the case has been filled, the electrolyte is allowed to permeate into the electrodes. Then, the electrolyte-filled battery is placed in a processing device, and fixed with a surface pressure between at least 0.1 MPa and 5.0 MPa. Thereafter, the cathode potential is adjusted and held for a period of one hour and 35 hours while the battery remains fixed, after which the pre-initial charging process is terminated.

2 Claims, 15 Drawing Sheets

(51) Int. Cl.
*H01M 10/04* (2006.01)
*H01M 10/052* (2010.01)
*H01M 10/44* (2006.01)

(52) U.S. Cl.
CPC ... *H01M 10/0468* (2013.01); *H01M 10/0481* (2013.01); *H01M 10/052* (2013.01); *H01M 10/44* (2013.01); *H01M 10/446* (2013.01); *Y02T 10/7011* (2013.01); *Y10T 29/49108* (2015.01)

(58) Field of Classification Search
CPC ... H01M 10/44; H01M 10/446; H01M 2/1077
See application file for complete search history.

(56) References Cited

U.S. PATENT DOCUMENTS

| | | |
|---|---|---|
| 2008/0143337 A1 | 6/2008 | Fujikawa et al. |
| 2008/0186030 A1 | 8/2008 | Kasamatsu et al. |
| 2010/0209767 A1 | 8/2010 | Kasamatsu et al. |

FOREIGN PATENT DOCUMENTS

| | | |
|---|---|---|
| JP | 2004-220956 A | 8/2004 |
| JP | 2005-158643 A | 6/2005 |
| JP | 2005-243537 A | 9/2005 |
| JP | 2006-086060 A | 3/2006 |
| JP | 2006-172901 A | 6/2006 |
| JP | 2006-269245 A | 10/2006 |
| JP | 2007-026752 A | 2/2007 |
| JP | 2007-042486 A | 2/2007 |
| JP | 2008-192495 A | 8/2008 |
| JP | 2009-164062 A | 7/2009 |
| JP | 2010-086754 A | 4/2010 |
| WO | WO 2008/132837 A1 | 11/2008 |

OTHER PUBLICATIONS

JP 11339853 English Translation via JPO, Translated Mar. 17, 2015.
JP 2006-086060 English Translation via JPO, Translated Mar. 17, 2015.
U.S. Appl. No. 13/133,428, filed Jun. 8, 2011.

PROCESSING DEVICE OF NONAQUEOUS ELECTROLYTE SECONDARY BATTERY AND MANUFACTURING METHOD THEREOF

CROSS-REFERENCE TO RELATED APPLICATIONS

This is a division of application Ser. No. 13/133,428, which is a national phase application of International Application No. PCT/JP2010/053798, filed Mar. 8, 2010, the contents of both of which are incorporated herein by reference.

TECHNICAL FIELD

The present invention relates to a processing device for a nonaqueous electrolyte secondary battery and a manufacturing method thereof and, more particularly, to a processing device before initial Charging and a manufacturing method including a pre-initial charging process.

BACKGROUND ART

In recent years, the popularity of portable and cordless electronic devices has rapidly increased. Accordingly, there has also been a great increased in the desire for small and light nonaqueous electrolyte secondary batteries having a high energy density to use as a driving power source of such an electronic device. The development of techniques for nonaqueous electrolyte secondary batteries, not only for electronic devices but also for power storage or electric vehicles with longer durability or the like, has accelerated.

In order to obtain longer durability and other improvements, nonaqueous electrolyte secondary batteries free from internal short-circuits, voltage drop defects, and the like are desirable, with some attention focusing on prevention of the immixing of metallic foreign bodies during the process of manufacturing such a nonaqueous electrolyte secondary battery has been pointed out. The possibility that immixed metallic foreign bodies may melt and be disposed within a battery in such a manner as to penetrate a separator and cause a short-circuit has been noted.

Conventionally, in order to avoid internal short-circuiting, voltage drop defects, and the like in the secondary batteries, it has been assumed that metallic foreign bodies are immixed in nonaqueous electrolyte secondary batteries and pre-shipment preparation processes for foreign body removal and the like have been performed.

Japanese Patent Laid-open Publication No. 2005-158643 (Patent Document 1) discloses, as a method for testing a lithium ion secondary battery, which is a nonaqueous electrolyte secondary battery in which reliable and quick discovery of defective batteries, a method in which a lithium ion battery is held in an environment in which the temperature is 45° C. or hotter for ten or more days, or 60° C. to 70° C. for four or more days, before detection of a voltage drop, and presence of electrically conductive foreign bodies in the lithium ion battery is determined upon detection of a voltage drop larger than a predetermined voltage drop reference.

Japanese Patent Laid-open Publication No. 2005-243537 (Patent Document 2) discloses a method for suppressing occurrence of minute short-circuiting between a cathode and an anode by initially charging a lithium ion secondary battery which is a nonaqueous electrolyte secondary battery to 0.01% to 0.1% of the battery capacity to thereby set the anode potential to 1.5 v or larger under the Li/Li$^+$ reference and the cathode potential to 3.5 v or larger under the Li/Li$^+$ reference, and then allowing the battery to stand for one to 48 hours.

RELATED ART DOCUMENTS

Patent Document 1: Japanese Patent Laid-open Publication No. 2005-158643
Patent Document 2: Japanese Patent Laid-open Publication No. 2005-243537

DISCLOSURE OF INVENTION

Problems to be Solved by the Invention

However, according to the above-noted Patent Document 1, it is necessary to leave a lithium ion secondary battery alone in a heating environment for four to ten days, which problematically increases manufacturing costs. According to the above-noted Patent Document 2, a charging device is necessary to charge a battery to 0.01% to 0.1% of the battery capacity, which also problematically increases manufacturing costs. In view of these problems, a more efficient selection method has been desired.

An object of the present invention is to provide a processing device for a nonaqueous electrolyte secondary battery capable of melting and diffusing metallic foreign bodies immixed in the nonaqueous electrolyte secondary battery before initially charging the battery, and to provide a method of manufacturing a nonaqueous electrolyte secondary battery.

Means to Solve the Problem

A processing device for a nonaqueous electrolyte secondary battery according to the present invention is a processing device for a nonaqueous electrolyte secondary battery having electrodes accommodated, together with nonaqueous electrolyte, in a battery case, the electrodes including a cathode plate and an anode plate arranged with a separator in-between, for melting and diffusing metallic foreign bodies immixed in the electrodes, the processing device comprising a space reducing unit for reducing a space present in the electrodes being uncharged, to thereby place the nonaqueous electrolyte secondary battery in a space-reduced state, and a holding unit for holding a cathode potential at a melting potential of the metallic foreign bodies for a predetermined period of time in the space-reduced state, the melting potential of the metallic foreign bodies being lower than a charge-discharge cathode potential for use in charging and discharging the nonaqueous electrolyte secondary battery.

Preferably, in a processing device for a nonaqueous electrolyte secondary battery according to the present invention, the space reducing unit may be a battery fixing unit for fixing the battery case on an outer surface thereof by applying a predetermined surface pressure sufficient to bring the cathode plate into contact with the metallic foreign bodies.

Also preferably, in a processing device for a nonaqueous electrolyte secondary battery according to the present invention, the battery fixing unit may use a surface pressure between 0.1 MPa and 5.0 MPa as the predetermined surface pressure.

Also preferably, in a processing device for a nonaqueous electrolyte secondary battery according to the present invention, the battery fixing unit may further have a battery heating unit for heating the nonaqueous electrolyte secondary battery.

Also preferably, in a processing device for a nonaqueous electrolyte secondary battery according to the present invention, the holding unit may hold a cathode potential of the nonaqueous electrolyte secondary battery in an open-circuit state in a case where the metallic foreign bodies are assumed to be of iron.

A manufacturing method for a nonaqueous electrolyte secondary battery according to the present invention is a method for manufacturing a nonaqueous electrolyte secondary for melting and diffusing metallic foreign bodies immixed in a nonaqueous electrolyte secondary battery having electrodes accommodated, together with nonaqueous electrolyte, in a battery case, the electrodes including a cathode plate and an anode plate arranged with a separator in-between, the method comprising a space reducing step of reducing a space in the uncharged electrodes to thereby place the nonaqueous electrolyte secondary battery in a space-reduced state, and a holding step of holding a cathode potential at a melting potential of the metallic foreign bodies for a predetermined period of time in the space-reduced state, the melting potential of the metallic foreign bodies being lower than a charge-discharge cathode potential for use in charging and discharging the nonaqueous electrolyte secondary battery In a manufacturing method for a nonaqueous electrolyte secondary battery according to the present invention, preferably, the space reducing step may be a battery binding step of binding the battery case on an outer surface thereof by applying a predetermined surface pressure sufficient to bring the cathode plate into contact with the metallic foreign bodies.

Also, in a manufacturing method for a nonaqueous electrolyte secondary battery according to the present invention, preferably, the space reducing step may be a battery depressurizing step of reducing pressure in the battery case.

Also, in a manufacturing method for a nonaqueous electrolyte secondary battery according to the present invention, preferably, the space reducing step may be a battery heating step of heating the battery, based on a predetermined heating condition, after the battery binding step, and thereafter releasing the battery.

Also, in a manufacturing method for a nonaqueous electrolyte secondary battery according to the present invention, at the holding step, preferably, a cathode potential of the nonaqueous electrolyte secondary battery in an open-circuit state may be held in a case where the metallic foreign bodies are assumed to be of iron.

Advantage of Present Invention

By employing a processing device for a nonaqueous electrolyte secondary battery having the above described structure and a method for manufacturing a nonaqueous electrolyte secondary battery, with an arrangement in which metallic foreign bodies are kept contacting the cathode plate having a potential equal to that at which the metallic foreign bodies melt, the metallic foreign bodies will melt and be diffused before initial charging. This can suppress occurrence of internal short-circuiting, voltage drop defects, and other problems which may result from the inmixing of metallic foreign bodies in a nonaqueous electrolyte secondary battery.

DESCRIPTION OF THE PREFERRED EMBODIMENTS

Figure 1:
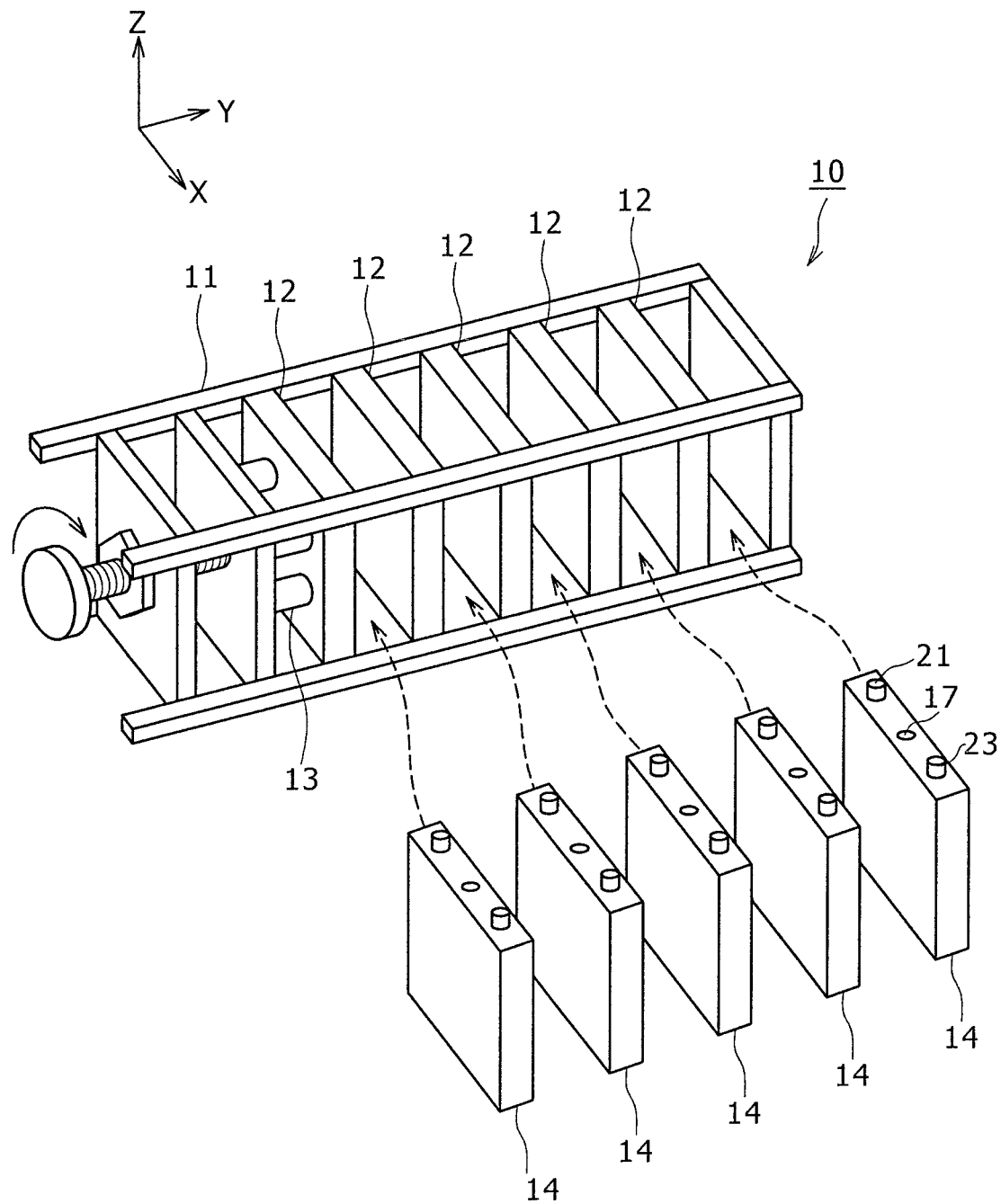
FIG. 1 is a diagram explaining a device for processing a nonaqueous electrolyte secondary battery in an embodiment according to the present invention.

In the following, embodiments of the present invention will be described in detail with reference to the diagrams. The materials, shapes, dimensions, and the like described below are merely examples for illustration, and any other appropriate materials, shapes, dimensions and the like can be employed according to the specification of a product.

Although in the following, a lithium ion secondary battery having a lithium nickel oxide cathode and a graphite anode is described as an object to be processed, a nonaquaous electrolyte secondary battery having a cathode and an anode made of any other appropriate material may be used. In this specification, a lithium ion secondary battery will be referred to simply as "a battery".

Although an example in which a polyethylene separator is used will be described in the following, a polyolefin-based insulating porous film may be used instead. For example, a polyethylene film, a film made of laminated polyethylene and polypropylene or the like may be desirably used.

Although rolled-up electrodes including a cathode plate, an anode plate, and a separator will be described in the following, multi-plate stacked electrodes or the like may be used instead. Further, although flat electrodes will be described in the following, cylindrical electrodes or the like may be used instead.

Although an example in which nonaqueous electrolyte produced by mixing ethylene carbonate and diethyl carbonate, or nonaqueous solvent, at a volume ratio 4:6 and dissolving lithium hexafluorophosphate, or solute, with a density of 1.0 mol/L is used will be described in the following, any other appropriate nonaqueous solvent and solute may be used instead.

In the following, identical elements are given identical reference numerals throughout all diagrams, and their description is not duplicated. Reference numerals having been mentioned thus far may be used when necessary in the description.

First Embodiment

FIG. 1 is a diagram explaining a processing device 10 for a nonaqueous electrolyte secondary battery. The XYZ axis shown in FIG. 1 is defined such that the x direction corresponds to the width direction of the processing device 10, the y direction corresponds to the thickness thereof, and the z direction corresponds to the height direction thereof. The processing device 10 is a device for holding one or more batteries 14 to be described in detail referring to FIG. 2 in a frame 11, then applying constant surface pressure to the batteries 14, using a pressing portion 13, preferably, via a fixing element 12, to thereby reduce the space d between the cathode plate 20 and the anode plate 22 to be described in detail referring to FIG. 3, and thereafter maintaining the state in which the space d is reduced (a space-reduced state) for a predetermined period of time. The processing device 10 can apply surface pressure to one or more batteries 14 at the same time. The processing device 10 comprises the frame 11, the fixing element 12, and the pressing portion 13, with the fixing element 12 being omissible.

The frame 11 has a function of serving as an outer frame of the processing device 10, and at least the fixing element 12, the pressing portion 13, and the battery 14 can be accommodated in the frame 11. At least one or more batteries 14 can be accommodated in the frame 11, and the number of fixing elements 12 same as that of the batteries 14 accommodated are used. In the example below, it is assumed that five batteries 14 are accommodated. In accommodation into inside the frame 11, a battery 14 is put onto a fixed side wall disposed on the shorter edge of the frame 11, and thereafter the fixing element 12 is positioned on the battery 14. Five batteries and five fixing elements 12 are alternately placed in this order. Thereafter, the pressing portion 13 is set in a position next to the fixing element 12 last placed.

The frame 11 can be made of, for example, aluminum alloy. Alternatively, a material such as stainless steel or the like which is unlikely to rust, can be used. In these cases, preferably, an insulating layer may be provided on the outermost surface of the frame 11. Other materials available for the frame 11 may include polytetrafluoroethylene or the like. The dimensions of the frame 11 can be determined in accordance with the shape and dimension of a battery 14 to be accommodated therein. If a battery 14 to be accommodated has a width 100 mm, thickness 20 mm, and height 150 mm, the dimensions of the frame 11 can be width 120 mm, thickness 200 mm, and height 170 mm.

The fixing element 12 has a function of binding the installed battery 14, and may be of the same width and height as the battery 14 to be accommodated. While the fixing element 12 can be made using a flat panel of the same material as that of the frame 11, desirably, fire-resistive heat insulating material may be used for the fixing element 12. Preferably, an insulating layer may be provided on the outermost surface of the fixing element 12, similar to the frame 11, because the fixing element 12 is to contact a battery 14. The dimensions of the fixing element 12 may be set in accordance with the shape and dimension of a battery 14 to be accommodated. If the dimensions of the battery 14 to be accommodated are width 100 mm, thickness 20 mm, and height 150 mm, the fixing element 12 may be designed with dimensions of width 100 mm, thickness 10 mm, and height 150 mm.

The pressing portion 13 is a flat panel having, for example, four pressing pins coupled on one side thereof and with an external force applied to the other side of the flat panel can apply pressure to the fixing element 12 via the pressing pins. Use of four pressing pins makes it possible to apply substantially constant pressure onto the fixing element 12. That is, the pressing portion 13 has a function of applying substantially constant surface pressure to a surface having a larger area of the battery 14 by means of pressure applied to the fixing element 12.

To apply an external force to the pressing portion 13, a screw mechanism or the like for moving the pressing portion 13 relative to the frame 11 can be used. For example, a screw mechanism comprises a fixing panel, a nut and a bolt, in which the nut and the bolt are fixed to the fixing panel with, when necessary, an elastic member or the like, such as a spring or rubber, interposed between the fixing panel and the nut, the fixing panel having a threaded hole formed thereon for receiving the bolt. Then, by turning the bolt around, the pressing portion 13 is pressed by the tip end of the bolt, whereby an external force is applied to the pressing portion 13.

With a configuration as above, a surface pressure can be measured using a load cell attached to the pressing portion 13. Alternatively, another method may be used for the measurement, including use of a surface pressure measurement sheet provided between the battery 14 and the fixing element 12.

In the above, the function of the screw mechanism which generates a predetermined surface pressure by turning the bolt corresponds to a space-reducing function or unit of the processing device 10. The function of using the nut to fix the bolt so that it will no longer turn once a predetermined surface pressure has been obtained, and of then holding that state, corresponds to the holding function or unit of the processing device 10.

Figure 2:
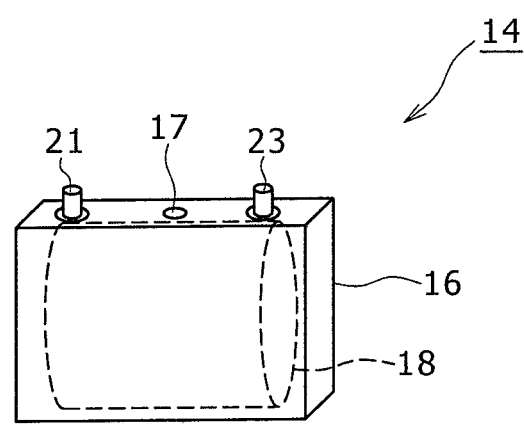
FIG. 2 is a diagram explaining a structure of a battery in an embodiment according to the present invention.

FIG. 2 is a diagram explaining a structure of the battery 40. For example, a vehicle battery to be mounted on a vehicle is a battery assembly comprising two or more electric cells. As each of the electric cells constituting an assembled battery, e.g., a lithium ion secondary battery having an average voltage being about 3.5 v is available, wherein the average voltage is a average of inter-electrode potential differences between a lithium nickel oxide cathode and a graphite anode in the plurality of electric cells constituting the battery assembly. In this embodiment, an electric cell of a lithium ion secondary battery is used as a battery 14. A battery 14 is placed in the processing device 10, and subjected to a pre-initial charging processing. A battery 14 comprises electrodes 18 and electrolyte (not shown) in a battery case 16 having a sealing valve 17, a cathode terminal 21, and an anode terminal 23.

The battery case 16 is made of aluminum or made using an aluminum and resin-laminated sheet, or the like. The battery case 16 has a sealing valve 17 on an upper portion thereof. The sealing valve 17 is kept open when pouring electrolyte and then closed after the pouring. The cathode terminal 21 is a terminal adapted to electrical connection to the cathode plate 20, while the anode terminal 23 is a terminal adapted to electrical connection to the anode plate 22.

Figure 3:
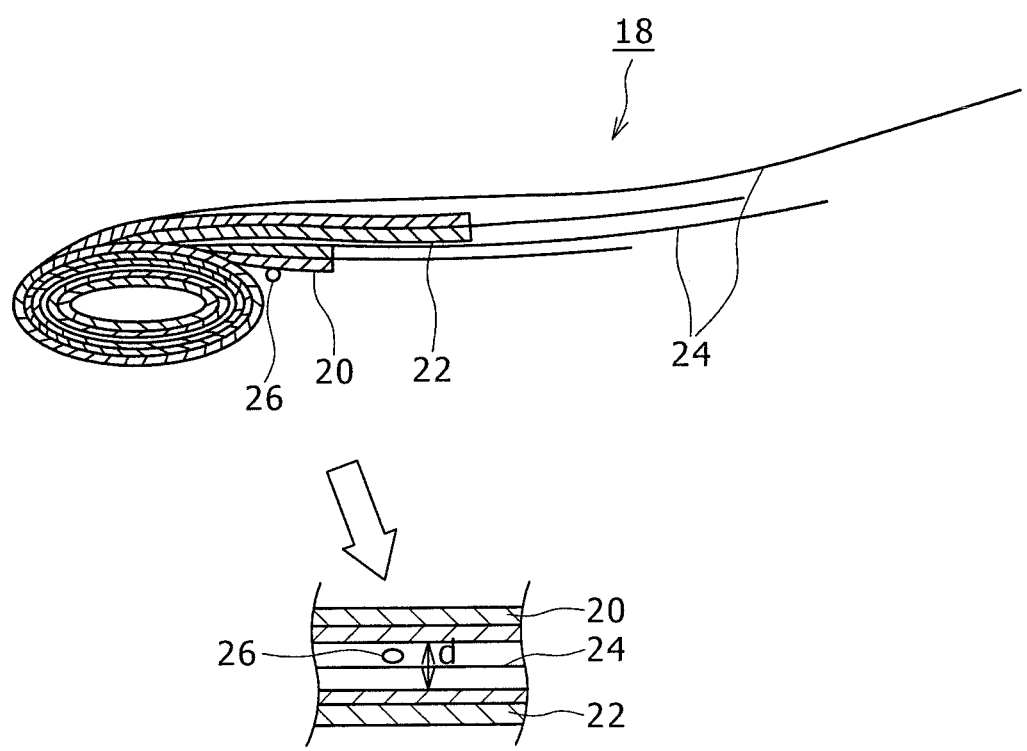
FIG. 3 is a diagram explaining a structure of electrodes in an embodiment according to the present invention.

FIG. 3 is a diagram explaining a structure of the electrodes 18. The electrodes 18 comprise a cathode plate 20, an anode plate 22, and a separator 24. The electrodes 18 are wound such that the separator 24 sandwiched by the cathode plate 20 and the anode plate 22. When the battery 14 is charged, lithium ions are discharged from the cathode plate 20 and lithium ions are absorbed by the anode plate 22, causing the electrodes 18 to expand. Generally, the battery 14 has the dimensions defined in consideration of change in thickness of the electrodes 18 due to the expansion. An uncharged battery 14 before expansion leaves a small space "d" between the cathode plate 20 and anode plate 22 of the electrodes 18.

Figure 4:
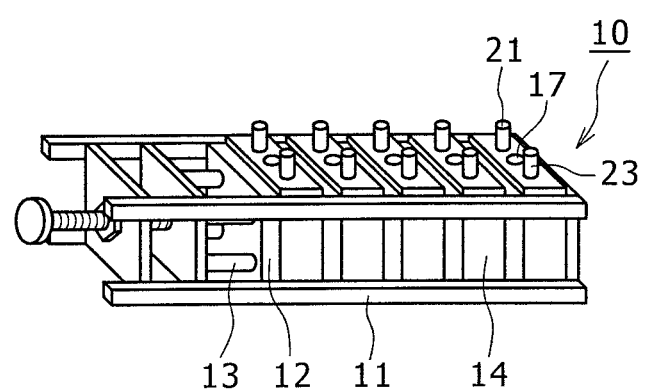
FIG. 4 is a diagram explaining batteries fixed in the processing device according to an embodiment of the present invention.

FIG. 4 is a diagram explaining batteries 14 installed and fixed in the processing device 10. As has been described referring to FIG. 1, the battery 14 is accommodated in the frame 11 of the processing device 10, and the fixing element 12 is provided on the side of the battery 14 where the pressing portion 13 is located. Thereafter, a predetermined surface pressure is applied to the battery 14 by the pressing portion 13.

Figure 5:
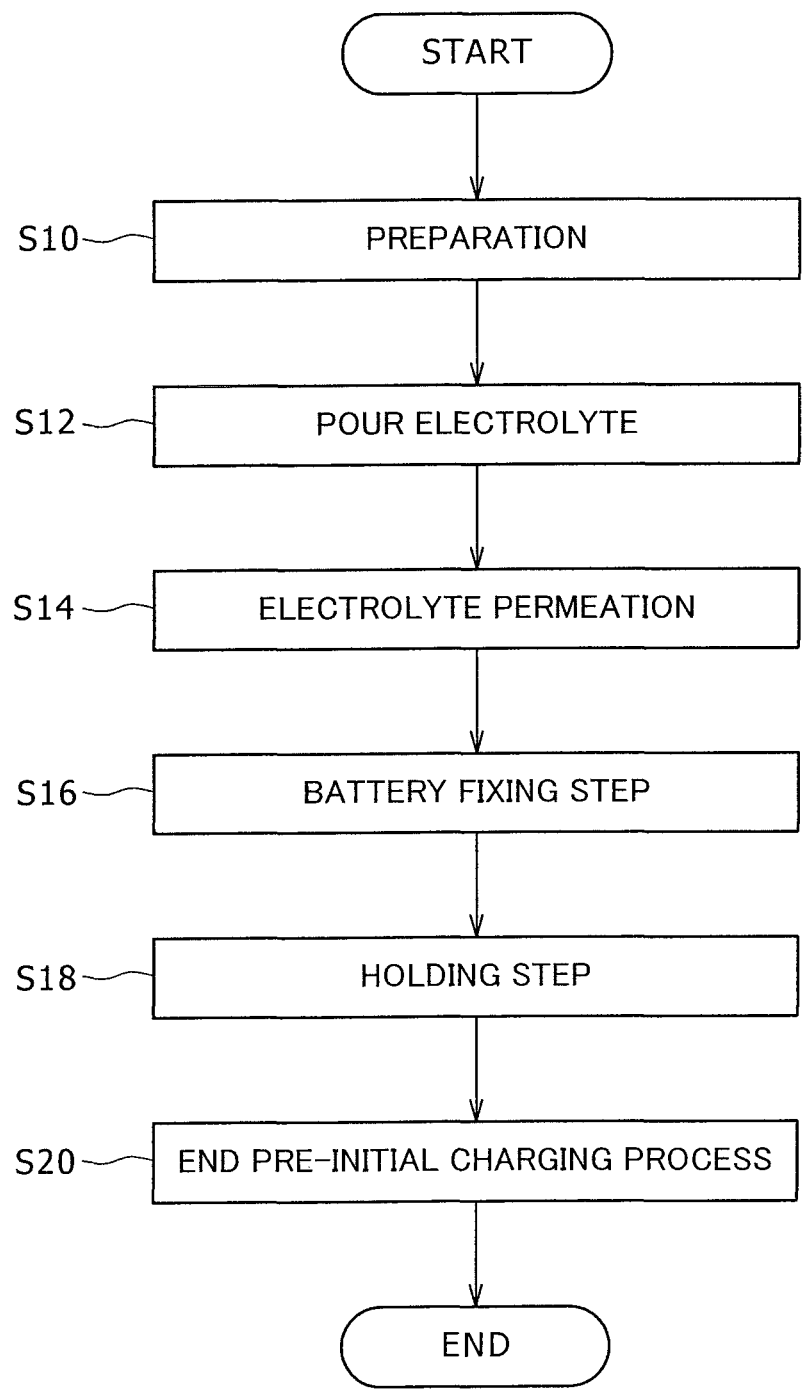
FIG. 5 is a flowchart explaining a procedure of a method for manufacturing a nonaqueous electrolyte secondary battery in an embodiment according to the present invention.

An operation produced by the above described structure will be described in detail referring to the flowchart of FIG. 5. FIG. 5 is a flowchart explaining a procedure within a method of manufacturing a nonaqueous electrolyte secondary battery. In this procedure, a battery 14 having electrodes 18 in the battery case 16 is provided; electrolyte is introduced and allowed to permeate through the electrodes 18; surface pressure is applied to the battery 14; and a space-reduced state with the space "d" reduced is maintained for a predetermined period of time; and thereafter the pre-initial charging process is terminated.

During initial preparation of a battery 14 (S10), electrodes 18 such that the cathode plate 20 and the anode plate 22 sandwich the separator 24 are installed in the battery case 16.

Then, electrolyte is poured into the battery case 16 in which the electrodes 18 has been installed (S12). The sealing valve 17 provided on the battery case 16 is opened for the pouring procedure, and closed after pouring has been completed. After the pouring, the electrolyte may be allowed to permeate (S14) by allowing the battery 14 to sit.

While the cathode terminal 21 and the anode terminal 23 of the battery 14 are left open, or in an open circuit state, such five batteries 14 into which have been filled with electrolyte are placed in the processing device 10, as shown in FIG. 4, and then fixed by applying a surface pressure between at least 0.1 MPa and 5.0 MPa (S16). This step corresponds to the space reducing step at which the space "d" between the cathode plate 20 and the anode plate 22 is reduced. Concerning surface pressure, surface pressure is applied using the processing device 10 to eliminate the space "d" and ensure that, e.g., iron-based foreign bodies contact the cathode plate 20, because it can be expected that any metallic foreign bodies 26 which are the iron-based foreign bodies, present near the cathode plate 20, may not contact the cathode plate 20 when there exists in such the space "d". In view of the above, a surface pressure of between at least 0.1 MPa and 5.0 MPa, more preferably, between at least 0.1 MPa and 2.0 MPa, is applied. The applied pressure must be no less than 0.1 Mpa because a surface pressure of less than 0.1 MPa is too small to maintain a constant surface pressure, such that an inconstant surface pressure will be applied to the electrodes 18. Meanwhile, because application of a too high surface pressure when a porous film is used for the separator may crush the pores of the separator, the upper limit of the surface pressure is defined such that the extent of porousness of the separator does not drop.

After preparation, the space-reduced state is maintained for between at least one to 35 hours (S18). While the holding time may differ depending on the nature, dimensions, and the like, of metallic foreign bodies 26 which can be removed by the time of initial charging, it can be understand based on the melting speed of the metallic foreign bodies 26 that such a state must be held for at least one hour. A longer holding time ensures reliable melting of metallic foreign bodies 26. However, as the copper or the like constituting the anode charge collector which is a component of the electrodes 18 could melt at some potential, the holding time must be limited to, for example, 35 hours or shorter, that is, within a range which will not adversely affect the battery functionality.

After elapse of a predetermined period of time at the holding step, the pre-initial charging process step is terminated (S20). The initial charging is applied after the holding step (S18) because it has been confirmed through experimental observation that, because the melting potential of metallic foreign bodies 26 is lower than the charge/discharge cathode potential when the battery 14 has yet to be charged and remains in an open-circuit state, electrically conductive metallic foreign bodies 26 contacting the cathode plate 20 will gradually melt and be diffused, even if the battery 14 is not yet charged. In other words, so-called galvanic corrosion will occur, whereas such metallic foreign bodies 26 will not melt when not contacting the cathode plate 20.

An example in which the metallic foreign bodies 26 are iron-based foreign bodies will be described here. The electrically conductive iron-based foreign bodies are brought into reliable contact with the cathode plate 20 before initial charging with the cathode potential being equal to the melting potential of the iron-based foreign bodies, so that the iron-based foreign bodies melt and iron ions of the iron-based foreign bodies solvated in the electrolyte are diffused in the battery 14 before application of initial charging. With the above processing, it is possible to suppress occurrence of internal short-circuiting of the battery 14, voltage drop defects, and other disadvantages.

In the following, an example and comparative example will be used to illustrate embodiments of the present invention. It should be noted that the present inventions is not limited to this example.

Example

An example was prepared, following the procedure shown in FIG. 5. Initially, a battery 14 was prepared (S10). For preparation, electrodes 18 wound with the cathode plate 20 and the anode plate 20 sandwiching the separator 18 were installed in the battery case 16. The sealing valve 17 of the battery case 16 having the electrodes 18 therein was opened, and the battery case was filled with electrolyte (S12). After the pouring of the electrolyte, the sealing valve 17 was closed, and the electrolyte was allowed to permeate (S14).

Then, as shown in FIG. 4, five batteries 14 into which electrolyte have been poured were set in the frame 11, and fixed with a surface pressure of 2.0 MPa (S16) by the fixing element 12. The batteries 14 were held fixed for fifteen hours (S18) before the pre-initial charging process was terminated (S20). After termination of the pre-initial charging process, initial charging was performed.

Figure 6:
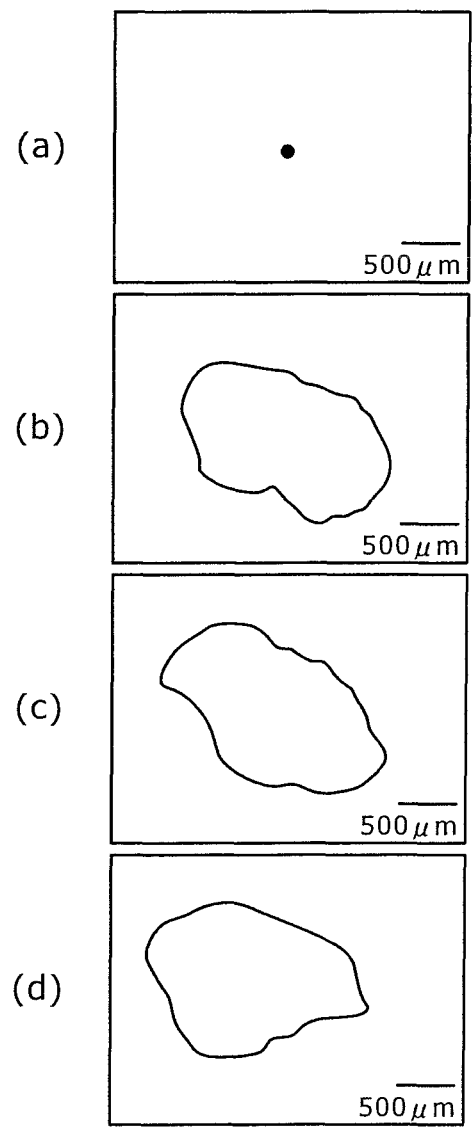
FIG. 6 is diagram explaining a result of observation of a cathode plate, an anode plate, and a separator in an example in an embodiment according to the present invention.

FIG. 6 is a diagram explaining results of observation of the cathode plate 20, the anode plate 22, and the separator 24 in the example. In order to verify the effects of the example, disk-like iron-based foreign bodies having a diameter of 100 μm and thickness of 20 μm were placed in advance in the vicinity of the cathode plate 20 when performing the example, following the procedure shown in FIG. 5. After initial charging, in order to verify the effects of the example, the battery 14 was decomposed and structural components, namely, the cathode plate 20, the anode plate 22, and the separator 24, were removed and observed with a microscope appropriate to the observation of metal.

FIG. 6A shows an observation of the cathode plate 20, in which a trace where the disk-like iron-based foreign bodies were placed could be observed. FIG. 6B shows an observation of a position on the separator 24 on the cathode plate 20 side, the position being opposed to the position where the iron-based foreign bodies were placed on the cathode plate 20, in which the iron-based foreign bodies were observed diffused in a larger area, leaving a stain. FIG. 6C shows an observation of a position on the separator 24 on the anode plate 22 side, the position being opposed to the position where the iron-based foreign bodies were placed on the cathode plate 20, in which the iron-based foreign bodies were observed diffused in a larger area, leaving a stain. FIG. 6D shows an observation of a position on the anode plate 22, the position being opposed to the position where the iron-based foreign bodies were placed on the cathode plate 20, in which the iron-based foreign bodies were observed diffused in a larger area, leaving a stain.

Based on the result observed with the example, it was confirmed that the iron-based foreign bodies in the battery 14 were melted and diffused, and no deposition of iron-based foreign bodies which reaches from the anode plate 22 to the cathode plate 20 was observed.

Comparative Example

Figure 7:
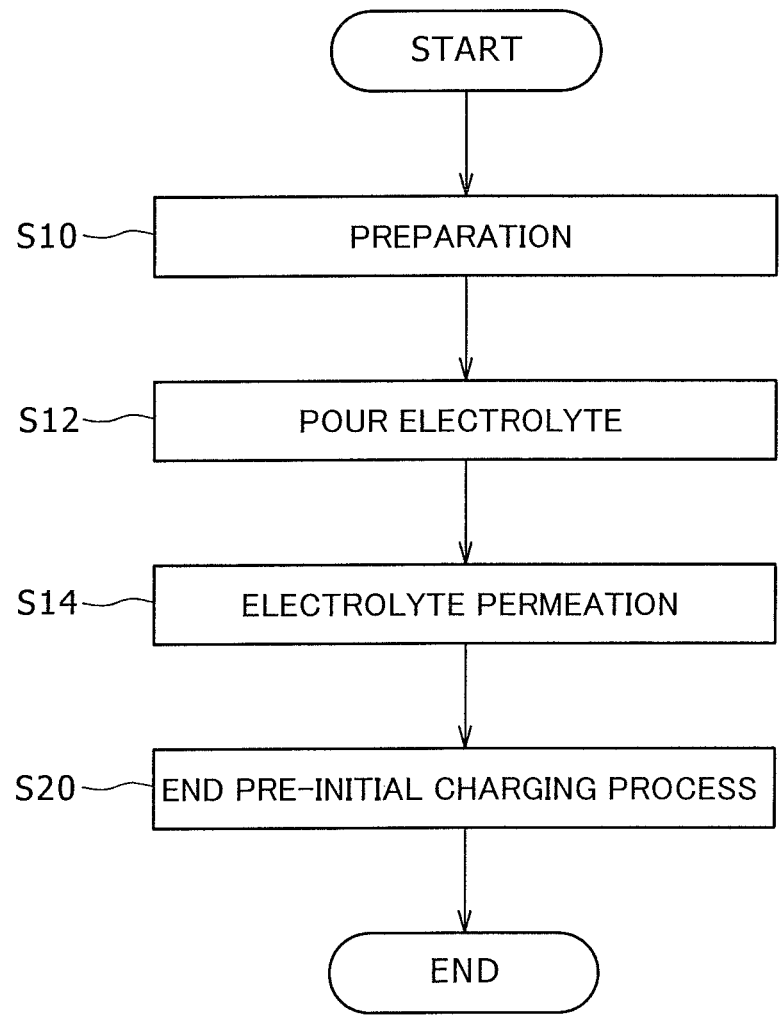
FIG. 7 is a flowchart explaining a procedure of a method of manufacturing a nonaqueous electrolyte secondary battery when a space reducing step and a holding step are not performed in the embodiment according to the present invention.

FIG. 7 is a flowchart explaining a procedure of a manufacturing method for a nonaqueous electrolyte secondary battery in which the battery fixing step (S16) and the holding step (S18), which correspond to the space reducing step, were not performed. The comparative example was carried out following the procedure shown in FIG. 7. Specifically, following a procedure similar to that shown in FIG. 5, respective steps from preparation (S10) to electrolyte permeation (S14) were performed. Thereafter, without performing the battery fixing step (S16) and the holding step (S18), corresponding to the space reducing step, the pre-initial charging process was terminated (S20).

Figure 8:
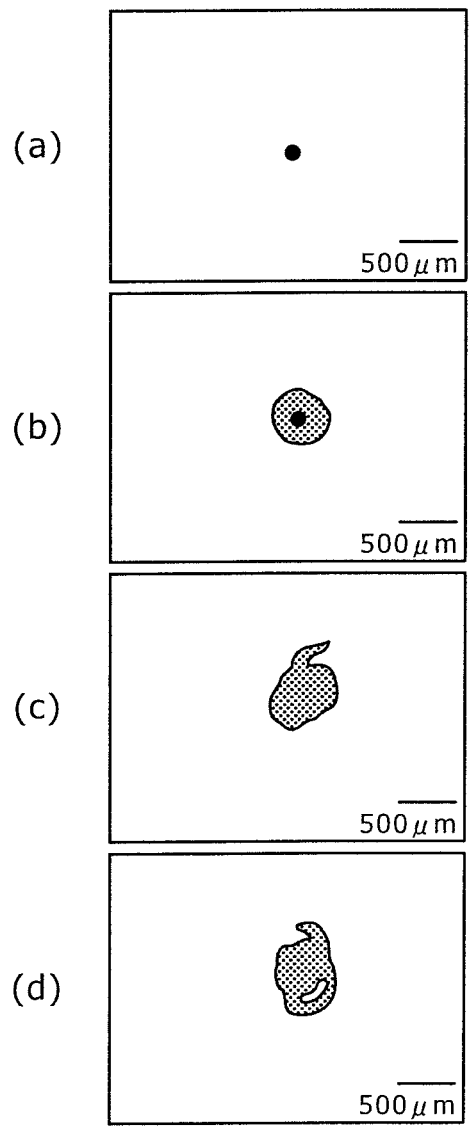
FIG. 8 is diagram explaining a result of observation of a cathode plate, an anode plate, and a separator in a comparative example in an embodiment according to the present invention.

FIG. 8 is a diagram explaining results of observation of the cathode plate 20, the anode plate 22, and the separator 24 in the comparative example. Similar to the example of the embodiment, in order to verify the effects of the comparative example, disk-like iron-based foreign bodies having a diameter of 100 μm and thickness of 20 μm were placed in advance in the vicinity of the cathode plate 20, following the procedure shown in FIG. 7. After initial charging, in order to verify the effects of the comparative example, the battery 14 was decomposed and structural components, namely, the cathode plate 20, the anode plate 22, and the separator 24, were removed and observed with the above microscope.

FIG. 8A shows results of observation of the cathode plate 20, in which a trace where the disk-like iron-based foreign bodies were placed could be observed. FIG. 8B shows an observation of a position on the separator 24 on the cathode plate 20 side, the position being opposed to the position where the iron-based foreign bodies were placed on the cathode plate 20, in which the iron-based foreign bodies were observed locally deposited, causing internal short-circuiting. FIG. 8C shows an observation of a position on the separator 24 on the anode plate 22 side, the position being opposed to the position where the iron-based foreign bodies were placed on the cathode plate 20, in which locally deposited iron-based foreign bodies were observed. FIG. 8D shows an observation of a position on the anode plate 22, the position being opposed to the position where the iron-based foreign bodies were placed on the cathode plate 20, in which locally deposited iron-based foreign bodies were observed.

Based on the results observed with the comparative example, it was confirmed that the iron-based foreign bodies in the battery 14 were melted, but deposited so as to reach from the anode plate 22 to the cathode plate 20.

Comparison between the example and the comparative example shows that, while the iron-based foreign bodies were observed melted and diffused but no deposition was observed in the example, the iron-based foreign bodies were observed both melted and deposited in the comparative example. From these observations, it was recognized that internal short-circuiting, voltage drop defects, and other defects, were probable in the comparative example, but that the process of the example was effective in suppressing occurrence of internal short-circuits, voltage drop defects, and other defects.

Second Embodiment

In the above first embodiment of the present invention, the battery 14 is fixed and held for a predetermined period of time. Alternatively, the battery 14 may be heated while fixed, then released from being fixed, and maintained for a predetermined period of time. In this case, the battery heating step corresponds to the space reducing step.

Figure 9:
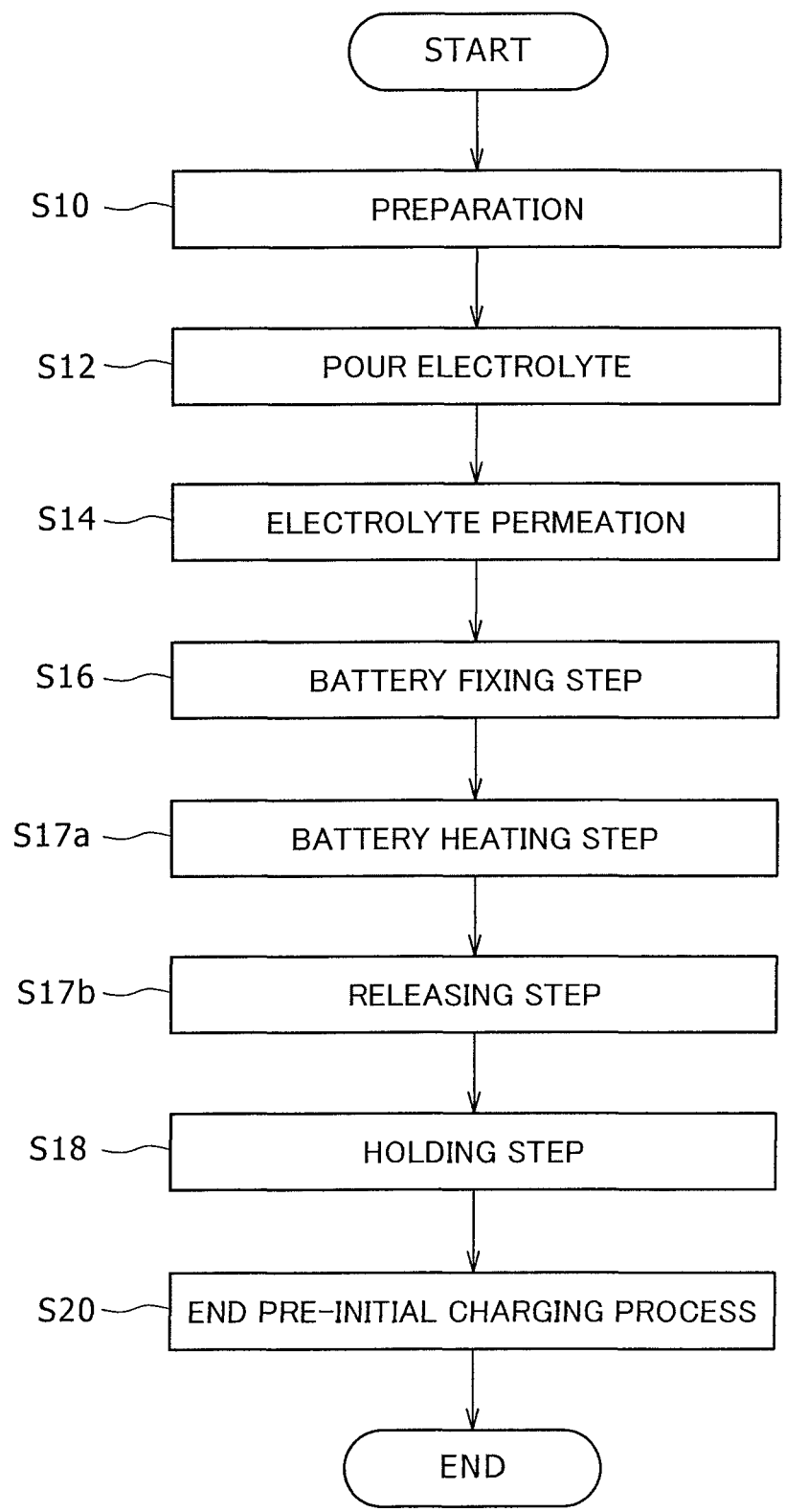
FIG. 9 is a flowchart explaining a procedure of a method of manufacturing a nonaqueous electrolyte secondary battery in an embodiment according to the present invention, in which the space reducing step is a battery heating step.

FIG. 9 is a flowchart explaining processes in a method of manufacturing a nonaqueous electrolyte secondary battery, in which the space reducing step is replaced by the battery heating step (S17a). Specifically, respective steps until the battery fixing step (S16) are performed, following a procedure similar to that shown in FIG. 5. Then, the battery 14 is heated while fixed, using the structure shown in FIG. 10 or FIG. 11 until the temperature inside the battery 14 reaches 25° C. to 60° C. (S17a). After the heating, the battery 14 is released (S17b). Then, respective steps from the holding step (S18) to the pre-initial charging process are performed, following a procedure similar to that shown in FIG. 5.

Figure 10:
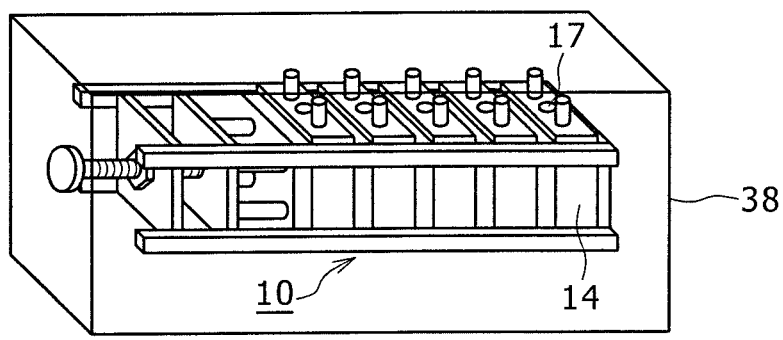
FIG. 10 is a diagram explaining batteries placed in the processing device and further in a high temperature furnace in an embodiment according to the present invention.
Figure 11:
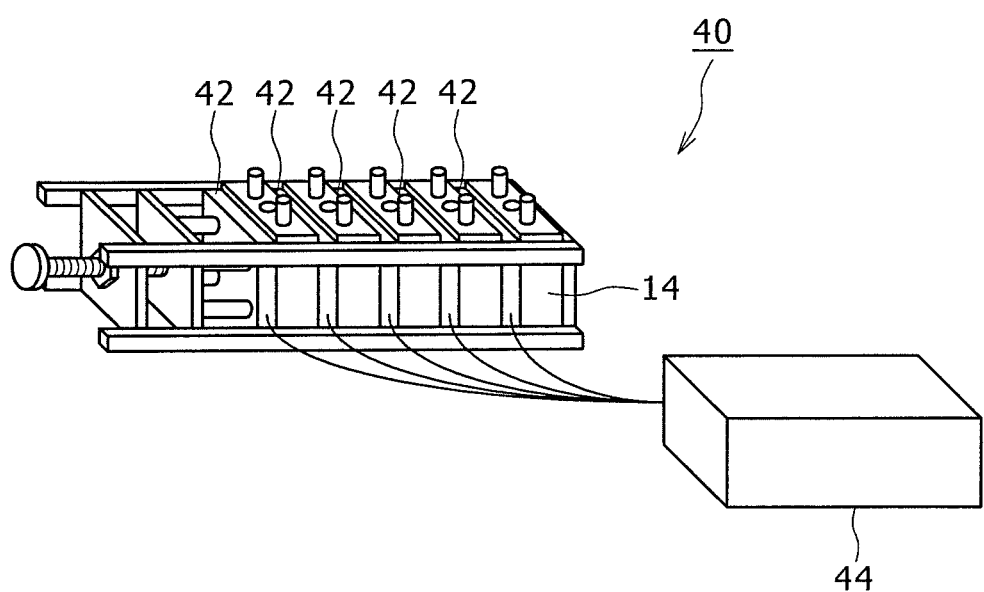
FIG. 11 is a diagram explaining a structure of a heating function-equipped processing device in an embodiment according to the present invention.

FIGS. 10 and 11 are diagrams explaining devices having a function of heating the battery 14. These devices can heat the fixed battery 14 so that the electrodes 18 are brought to and maintained in a closely contacting state, even after the battery 14 is released. With such configuration, a battery fixing device need only be used for a shorter period of time to maintain a reliable connection of the metallic foreign bodies 26 with the cathode plate 20. This can enable further cost reductions.

FIG. 10 is a diagram showing batteries 14 placed in the processing device 10 within a high temperature furnace 38. The batteries 14 arranged in the processing device 10 are placed in the high temperature furnace 38, which is then operated to heat the batteries 14 so that the temperature inside the batteries 14 increases to 25° C. to 60° C. The upper limit of the temperature is set to 60° C. in order to suppress dissolution of electrolyte which is known to begin dissolving at about 70° C. or higher. The electrodes 18 are maintained in a closely contacting state and remain so thereafter, even after the batteries 14 are released from being fixed.

FIG. 11 is a diagram explaining a structure of a heating function-equipped processing device 40. The heating function-equipped processing device 40 includes a heating function-equipped fixing element 42 and a heating control device 44. That is, the fixing element 12 of the above described processing device 10 is replaced by the heating function-equipped fixing element 42, and the heating control device 44 for controlling the heating function-equipped fixing element 42 is additionally provided. The heating function-equipped fixing element 42 has a function of heating the battery 14 to the above described temperature of, for example, 25° C. to 60° C., while applying a surface pressure between at least 0.1 MPa and 5.0 MPa to the batteries 14. The heating control device 44 has a function of controlling the heat temperature of the heating function-equipped fixing element 42.

Third Embodiment

With iron-based foreign bodies, it is possible to process a battery 14 being uncharged and in an open circuit state as described above because the melting potential of iron is equal to the cathode potential before initial charging. However, there may be situations in which foreign bodies made of a material other than iron, such as a stainless steel material represented by SUS304, that is, stainless steel foreign bodies, may possibly be immixed in a battery manufacturing process. In such a case, it is necessary to apply a predetermined surface pressure to the battery 14 to keep the stainless steel foreign bodies contacting the cathode plate 20 during a period after start of pouring electrolyte and before initial charging, and moreover to keep the cathode potential lower than the charge/discharge cathode potential so that the cathode potential is intentionally set equal to the melting potential of the stainless steel foreign bodies so that the stainless steel foreign bodies melt.

For example, stainless steel foreign bodies are known to be passivated at a potential lower than that required for foreign bodies made of iron. Therefore, if 18% of the mass of Cr is comprised of stainless steel foreign bodies, the cathode potential is adjusted to −0.25 v to +0.25 v according to the Standard Hydrogen Electrode Reference (2.8 v to 3.2 v according to the Li/Li$^+$ Reference) and so held.

Figure 12:
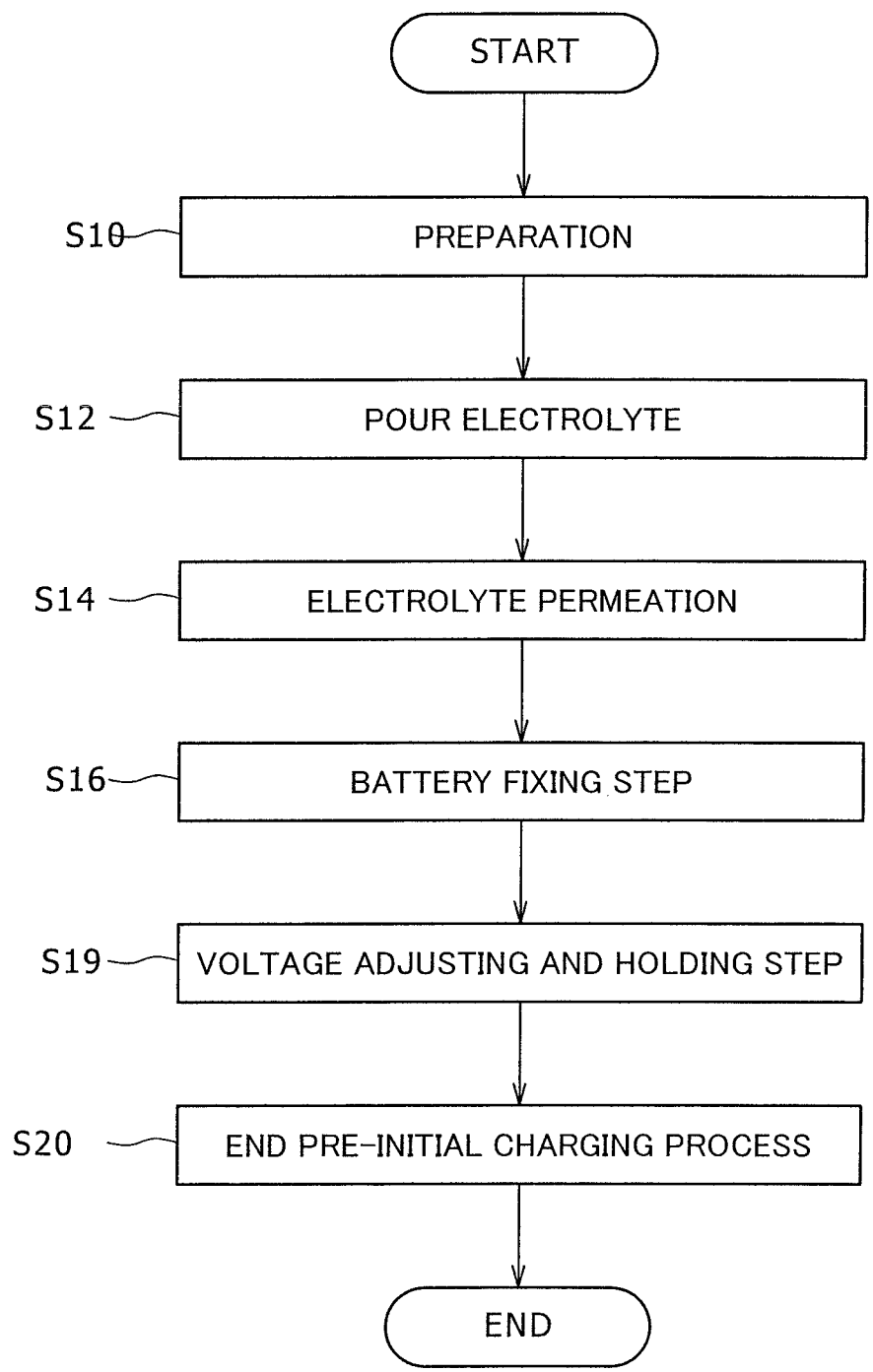
FIG. 12 is a flowchart of a procedure of a method of manufacturing a nonaqueous electrolyte secondary battery in an embodiment according to the present invention, in which the cathode potential is adjusted and maintained.

FIG. 12 is a flowchart explaining processes of a method of manufacturing a nonaqueous electrolyte secondary battery when the cathode potential is adjusted and so held. In this method, respective steps up to the battery fixing step (S16) are performed following a procedure similar to that shown in FIG. 5, and thereafter the cathode potential is adjusted and maintained using a power source device 36 having the structure shown in FIG. 13 (S19). In this embodiment, the state of holding corresponds to a state in which a surface pressure is maintained at a predetermined value and the cathode potential is kept at a potential which is lower than the charge/discharge cathode potential and at which metallic foreign bodies 26 melt. After maintenance of the potential is halted, a pre-initial charging process is terminated (S20), similarly as in FIG. 5.

Figure 13:
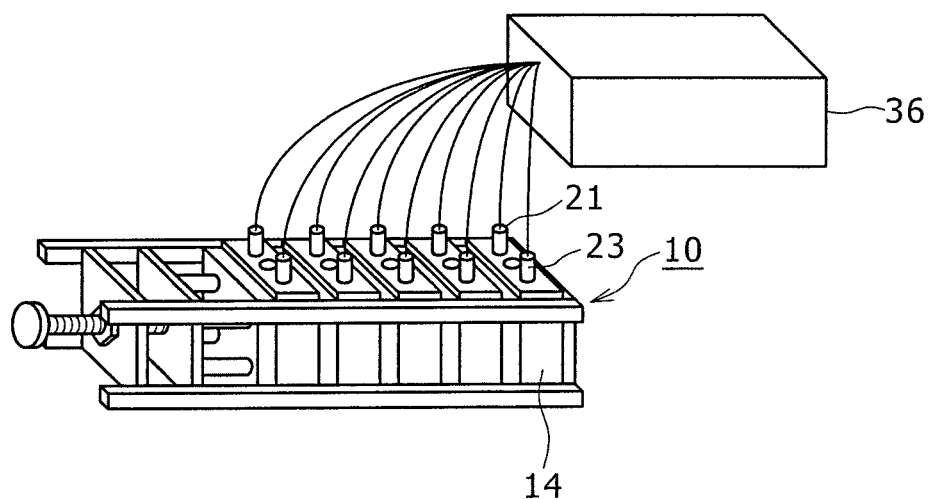
FIG. 13 is a diagram explaining a structure of a power source device, processing device, and batteries in an embodiment according to the present invention.

FIG. 13 is a diagram explaining structures of the power source device 36, the processing device 10, and the battery 14. The power source device 36 can be connected to the cathode terminal 21 and the anode terminal 23 of the battery 14, and has a function of adjusting and maintaining the cathode potential. In order to melt the stainless steel foreign bodies, the power source device 36 has a function of adjusting and maintaining the cathode potential while the battery is kept fixed. For adjustment, the cathode potential can be adjusted to −0.25 v to +0.25 v according to the Standard Hydrogen Electrode Reference. Alternatively, the battery voltage may be adjusted based on the relationship between the battery voltage and the desired cathode potential. The holding time is set to between at least one hour and 35 hours for the reasons described above.

Fourth Embodiment

In the first embodiment, the battery fixing step is described as a step corresponding to the space reducing step, while the battery fixing step (S16) is a step at which a surface pressure is externally applied to the battery 14. However, according to the method described here, the pressure inside the battery 14 is reduced to thereby eliminate the space "d" in the electrodes 18 so that the metallic foreign bodies 26 contact the cathode plate 20.

This procedure includes a battery depressurizing step instead of the battery fixing step (S16) corresponding to the space reducing step in the flowchart shown in FIG. 5. That is, respective steps until electrolyte permeation (S14) are performed. Then, instead of carrying out the battery fixing step (S16) corresponding to the space reducing step, the battery 14 is depressurized using the structure shown in FIG. 14 or FIG. 15, which are described below. Thereafter, respective steps from the holding step (S18) to termination of the pre-initial charging process (S20) are performed.

Figure 14:
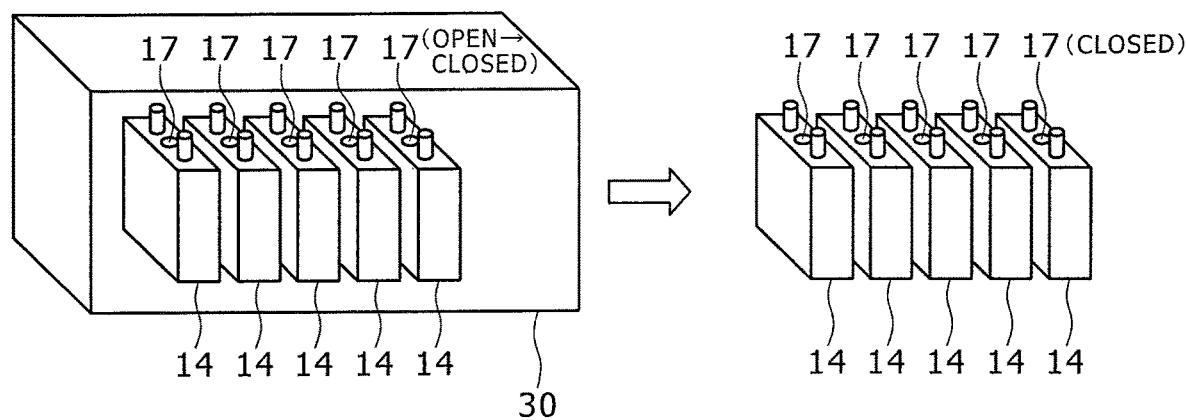
FIG. 14 is a diagram explaining a structure in which surface pressure is applied to batteries, using a vacuum furnace in an embodiment according to the present invention.
Figure 15:
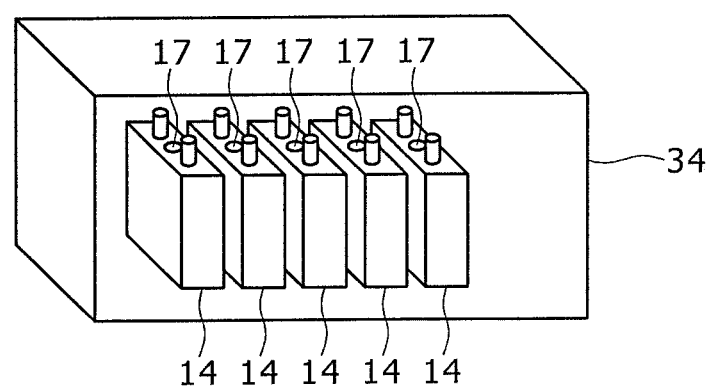
FIG. 15 is a diagram explaining a structure in which surface pressure is applied to batteries, using a high pressure furnace in an embodiment according to the present invention.

FIGS. 14 and 15 are diagrams explaining the operation and structure of a device having a function of applying a surface pressure to the electrodes 18. In a method of manufacturing a nonaqueous electrolyte secondary battery, a surface pressure between at least 0.1 MPa and 5.0 MP may be applied to the battery 14 at the space reducing step (S16). In such a case, the device shown in FIGS. 14 and 15 may be used instead of the processing device 10.

FIG. 14 is a diagram explaining a structure for applying surface pressure to the battery 14 using a vacuum furnace 30. Here, five (for example) batteries 14 are placed in the vacuum furnace 30, and depressurized to between 10 kPa and 100 kPa, and surface pressure is externally applied to the batteries 14. The batteries 14 are placed in the vacuum furnace 30 while the sealing valve 17 kept open, and then depressurized. Then, the sealing valve 17 is closed while the batteries 14 remain depressurized, and the batteries 14 are removed from the vacuum furnace 30. As a result, an effect similar to that obtained with the configuration shown in FIG. 4 can be attained.

FIG. 15 is a diagram explaining a structure for applying surface pressure to the battery 14 using a high pressure furnace 34. Because the pressure of the high pressure furnace 34 can be increased and maintained at a relatively high pressure, an effect similar to that described with reference to FIG. 14 can be produced using the high pressure furnace 34.

INDUSTRIAL APPLICABILITY

A processing device for a nonaqueous electrolyte secondary battery and a manufacturing method thereof according to the present invention are useful for nonaqueous electrolyte secondary batteries and their manufacture because of their ability to melt and diffuse metallic foreign bodies immixed in the nonaqueous electrolyte secondary battery before performance of initial charging.

REFERENCE NUMERALS 10 processing device, 11 frame, 12 fixing element, 13 pressing portion, 14 battery, 16 battery case, 17 sealing valve, 18 electrodes, 20 cathode plate, 21 cathode terminal, 22 anode plate, 23 anode terminal, 24 separator; 26 metallic foreign bodies, 30 vacuum furnace, 34 high pressure furnace, 36 power source device, 38 high temperature furnace, 40 heating function-equipped processing device, 42 heating function-equipped fixing element, 44 heating control device.

The invention claimed is:

1. A method for manufacturing a nonaqueous electrolyte secondary battery for melting and diffusing metallic foreign bodies immixed in a nonaqueous electrolyte secondary battery having electrodes accommodated together with a nonaqueous electrolyte in a battery case, the electrodes including a cathode plate and an anode plate arranged on opposite sides of a separator, the method comprising:
   a space reducing step of reducing a space in the uncharged electrodes, to thereby place the nonaqueous electrolyte secondary battery in a space-reduced state; and
   a holding step of holding a cathode potential at a melting potential of the metallic foreign bodies for a predetermined period of time in the space-reduced state, the melting potential of the metallic foreign bodies being lower than a charge-discharge cathode potential for use in charging and discharging the nonaqueous electrolyte secondary battery,
   wherein the space reducing step comprises fixing the battery case on an outer surface thereof by applying a predetermined surface pressure sufficient to bring the cathode plate into contact with the metallic foreign bodies.

2. The manufacturing method for a nonaqueous electrolyte secondary battery according to claim 1, wherein, at the holding step, a cathode potential of the nonaqueous electrolyte secondary battery in an open-circuit state is maintained, in a case that the metallic foreign bodies are assumed to be of iron.

* * * * *